United States Patent [19]

Egglhuber

[11] Patent Number: 5,616,065
[45] Date of Patent: Apr. 1, 1997

[54] WIRE SAW AND METHOD FOR CUTTING WAFERS FROM A WORKPIECE

[75] Inventor: Karl Egglhuber, Hebertsfelden, Germany

[73] Assignee: Wacker Siltronic Gesellschft für Halbleitermaterialien Aktiengesellschaft, Burghausen, Germany

[21] Appl. No.: 603,541

[22] Filed: Feb. 21, 1996

[30]     Foreign Application Priority Data

Mar. 23, 1995 [DE] Germany .................. 195 10 625.3

[51] Int. Cl.$^6$ ....................................... B24B 49/00
[52] U.S. Cl. .................... 451/10; 125/23.01; 125/21; 125/16.01; 125/16.02
[58] Field of Search .................. 451/9, 14, 297; 125/23.01, 21, 16.01, 16.02

[56]         References Cited

U.S. PATENT DOCUMENTS

| | | | |
|---|---|---|---|
| 3,447,306 | 6/1969 | Jakimcius | 451/297 |
| 3,831,576 | 8/1974 | Mech | 125/16.01 |
| 3,942,508 | 3/1976 | Shimizu | 125/21 |
| 4,134,384 | 1/1979 | Schafft et al. | 125/21 |
| 4,191,159 | 3/1980 | Collins | 125/21 |
| 4,655,191 | 4/1987 | Wells et al. . | |
| 4,903,682 | 2/1990 | Kurokawa | 125/16.01 |
| 4,991,475 | 2/1991 | Malcok et al. . | |
| 5,099,820 | 3/1992 | Stricot | 125/23.01 |
| 5,201,305 | 4/1993 | Takeuchi | 125/16.02 |
| 5,269,285 | 12/1993 | Toyama et al. | 125/21 |
| 5,287,774 | 2/1994 | Seifert . | |

FOREIGN PATENT DOCUMENTS

| | | |
|---|---|---|
| 0202630 | 11/1986 | European Pat. Off. . |
| 0433956 | 6/1991 | European Pat. Off. . |
| 0522542 | 1/1993 | European Pat. Off. . |
| 0552663 | 1/1993 | European Pat. Off. . |
| 3942671 | 6/1991 | Germany . |
| 9112915 | 9/1991 | WIPO . |
| 9429057 | 12/1994 | WIPO . |

OTHER PUBLICATIONS

Derwent Abstract for DE 3942671.
Derwent Abstract for EP–433956.
Patent Abstract of Japan, vol. 016, No. 510 (M–1328) Oct. 21, 1992.
Derwent Abstract for WO 552663 A.
Derwent Abstract for WO 9112915A.
Derwent Abstract for WO 94 29057.

*Primary Examiner*—James G. Smith
*Assistant Examiner*—Derris H. Banks
*Attorney, Agent, or Firm*—Collard & Roe, P.C.

[57]            ABSTRACT

A sawing method and a wire saw for cutting wafers from a workpiece comprises a guidance system for the guidance of wire segments into the intended cutting planes, having at least one measuring device and at least one controlling device, the measuring device detecting an incorrect position of the wire segments in relation to the intended cutting planes by measuring the distance to a measurement point whose spatial position is dependent on the incorrect position of the wire segments, and the controlling device effecting, if necessary, a compensating movement by means of force transmission, which compensating movement brings the wire segments into the intended cutting planes.

24 Claims, 6 Drawing Sheets

WIRE SAW AND METHOD FOR CUTTING WAFERS FROM A WORKPIECE

BACKGROUND OF THE INVENTION

1. Field of the Invention

The present invention relates to a wire saw for cutting wafers from a workpiece, in particular for cutting semiconductor wafers from rod-shaped or block-shaped semiconductor material. The invention also relates to a sawing method in which a wire saw according to the invention is used.

2. The Prior Art

Wire saws for cutting wafers from a workpiece are already known. The essential components of these wire saws are a machine frame, a feed device, and a roller system combined to form a sawing head and comprising a plurality of wire guide rollers which are rotatably mounted and of which at east one is driven. The actual sawing tool is a web of moving wire segments which are aligned to be parallel and which are stretched between the wire guide rollers. The wire segments may belong to a single finite wire which is coiled around the roller system and which is unwound from a feed roller onto a take-up roller. U.S. Pat. No. 4,655,191, on the other hand, discloses a wire saw in which a multiplicity of finite wires is provided and each wire segment of the wire web is assigned to one of these wires. EP-522,542 A1 also discloses a wire saw in which a multiplicity of endless wire loops run round the roller system. During the sawing operation, the feed device effects a mutually oppositely directed relative movement of the wire segments, which run in guide grooves perpendicularly to the axes of rotation of the wire guide rollers, and of the workpiece. As a consequence of this feed movement and of the supplying of a material-eroding sawing aid which is also described as "slurry", the wire segments work through the workpiece with the formation of parallel sawing gaps. DE-3,942,671 A1 discloses both the feed devices which feed the workpiece toward the stationary wire web and those which feed the cutting head of the wire saw toward the stationary workpiece. In principle, a plurality of wire gratings of a wire saw can also be used for simultaneously machining a plurality of workpieces. *Published Specification* EP-433,956 A1 describes, for example, a wire saw with which two workpieces can be sawn simultaneously.

The production of semiconductor wafers from rod-shaped or blocked-shaped semiconductor material, for example from monocrystalline rods, imposes particularly high requirements on the wire saw. As a rule, the sawing method has the objective that every semiconductor wafer sawn has side surfaces which are as flat as possible and are situated parallel to one another. The so-called "warp" of the wafers is a known measure of the deviation of the actual wafer shape from the desired ideal shape. The "warp" can, as a rule, be no more than a few μm Every wire segment of the wire web should therefore ideally be situated in the flat cutting plane intended for it at every instant in the sawing operation. The cutting planes intended are imaginary planes which are situated parallel to one another and which pass through the workpiece and between which the semiconductor wafers to be cut from the workpiece are situated. Every movement of the wire segments transversely to the intended cutting planes has the result that the shape (geometry) of the semiconductor wafers produced will deviate from the target requirement.

The causes which result in an incorrect position of the wire segments in relation to the intended cutting planes include, in particular, cutting forces which occur during sawing and which deflect the wire segments from the desired position. Also there are axial displacements of the wire guide rollers due to thermal expansion as a consequence of the heating of the drive of the wire guide rollers. In addition, there are the bearings of the wire guide rollers and the wire guide rollers themselves and play within the bearings as a result of the constant loading of the bearings over time periods of a few hours for one sawing operation. The feed device is also a source of error if the feed guide is not manufactured with adequate precision or if cutting forces cause the feed frame to stretch. In the two cases mentioned last, a movement of the workpiece occurs which is transverse to the intended cutting planes and which also has de facto the result that the wire segments are situated outside the intended cutting planes.

In order to prevent movements of the workpieces or of the wire segments which are transverse to the intended cutting planes, the machine frame and the supporting parts of the feed device and of the sawing head are, as a rule, constructed from heavy and mechanically durable parts, temperature-control devices are also being provided for their thermal stabilization.

SUMMARY OF THE INVENTION

It is an object of the present invention to provide a wire saw and a sawing method with which, in particular, semiconductor wafers having improved geometrical quality can be produced.

The above object is achieved according to the invention by providing a wire saw for cutting wafers from a workpiece, having a machine frame, having a feed device, having a roller system combined to form a cutting head and comprising a plurality of wire guide rollers which are linked to bearing spindles and are rotatably mounted and of which at least one is driven, and having at least one wire web used as sawing tool and comprising wire segments which are disposed in parallel between two wire guide rollers and which are moved perpendicularly to the axes of the wire guide rollers around the roller system and which work through the workpiece along intended cutting planes with the aid of the feed device with eroding means being supplied and with the formation of a multiplicity of parallel sawing gaps, which wire saw comprises a guidance system for the guidance of the wire segments into the intended cutting planes having at least one measuring device and at least one controlling device, the measuring device detecting an incorrect position of the wire segments in relation to the intended cutting planes by measuring the distance from a measurement point where spatial position is dependent on the incorrect position of the wire segments, and the controlling device effecting, if necessary, a compensating movement of the wire segments or of the workpiece by means of force transmission, which compensating movement brings the wire segments into the intended cutting planes.

The achievement of the object furthermore includes a method for cutting wafers from a workpiece with the aid of a wire saw according to the invention, wherein an incorrect position of the wire segments in relation to the intended cutting planes is detected with the aid of a measuring device by measuring the distance of a measurement point whose spatial position is dependent on the incorrect position of the wire segments and, in the event of a deviation of the measured distance from a set distance, a compensating movement of the wire segments or of the workpiece is effected with the aid of a controlling device, which compensating movement brings the wire segments into the intended cutting planes.

A basic idea of the present invention is that movements of the wire segment or of the workpiece which results in incorrect positions of the wire segments in relation to the intended cutting planes are detected and compensated for.

According to experience, the wire segments deviate from the intended cutting planes, in particular, as a result of heat-induced axial movements of the wire guide rollers of the wire web or of the bearing spindles of the wire guide rollers of the wire web or as a result of the occurrence of play within the bearing. Each of the wire guide rollers of the wire web is mounted, on one side, in a fixed bearing and, on the oppositely situated side, in a movable bearing. When a wire guide roller becomes hot, it expands in the direction of the movable bearing starting from the fixed-bearing side. During this process, the wire segments which are situated nearer to the fixed bearing are displaced to a lesser extent than the wire segments situated nearer to the movable bearing.

In order to minimize the thermal expansion of the wire guide roller as far as possible, it is proposed to manufacture the wire guide roller from a material whose coefficient of thermal expansion is $\alpha <= 1.0*10^{-6}$ $K^{-1}$, preferably, $\alpha <= 0.1*10^{-6}$ $K^{-1}$, ("<=" denotes "less than or equal to"). Glass-ceramic materials which fulfill this condition are preferred.

Because of the permanent supply of "slurry" and the soiling resulting therefrom, direct observation of the wire segments, for example by a measuring device disposed laterally with respect to the wire segments is extremely difficult. In addition, the machine setting-up time on replacing the wire guide rollers, for example due to the changeover of the wire saw to another workpiece size, would be lengthened in an impermissible manner because the measuring device would have to be realigned every time. The invention therefore provides a measuring device with which such problems do not occur.

According to the invention, movements of the wire segments which are transverse to the intended cutting planes are detected by observing axial positional variations of the wire guide rollers of the wire web or of their bearing spindles. The amount and direction of a positional variation determined by means of a distance measurement. It is particularly preferable to determine the positional variations of a wire guide roller of the wire web in its axial center. The measurement at this point of a wire guide roller yields a very precise mean value for the incorrect position of the wire segments in relation to the intended cutting planes. A similarly precise estimate of the incorrect position of the wire segments is achieved by observing axial positional variations of points on the axis of the wire guide roller or bearing spindle which are situated in line with, or virtually in line with, the first and the last wire segments of the wire web. For this purpose, the positional variation of a point in line with the first wire segment and the positional variation of a point in line with the last wire segment of the wire guide roller is measured and averaged. The resultant measured value indicates how far on average the wire segments have departed from the intended cutting planes. In addition, only the axial positional variation of a point in line with the first wire segment or only the axial positional variation of a point in line with the last wire segment or only the axial positional variation of the shaft and face of the bearing spindle may also be used to estimate the incorrect position of the wire segments approximately.

Since neither the axial center of the wire guide rollers of the wire web nor positions in the vicinity of the first and last wire segments are directly accessible to direct distance measurements, the invention provides for moving the measurement point which is dependent on axial movements of the wire guide rollers or their bearing spindles to the surface of a particular measuring element. This measuring element, for example a measuring disc or a measuring shaft, is preferably manufactured from a material whose coefficient of thermal expansion is $\alpha <= 1.0*10^{-6}$ $K^{-1}$, particularly preferably $\alpha <= 0.1*10^{-6}$ $K^{-1}$. Furthermore, this measuring element is linked to one of the preferred points on the axis of the wire guide roller or its bearing spindle, with the result that any positional variation in this point is manifested by a like positional variation in the measurement point. The measurement point on the surface of the measuring element, whose spatial position is dependent on movements of the wire segments which are transverse to the intended cutting planes, must be readily accessible for distance measurements. The distance is measured from a positionally fixed measuring device to the measuring point. The measuring device is preferably situated on the machine frame or is linked to the machine frame. Suitable as measuring devices are known distance measuring devices which operate on the basis of an optical, hydraulic, pneumatic, capacitive or inductive measuring principle.

The requirement for good accessibility of the measurement point can be fulfilled, for example, in that the measuring element extends up to the vicinity of the measuring head of the measuring device. Depending on the measuring principle used, a measuring device having an elongated measuring head, for example a measuring rod, may also be provided, which is brought up to the vicinity of the measurement point and at whose tip the distance-measuring sensor is situated. The measuring rod, which is preferably also manufactured from a material whose coefficient of thermal expansion is $\alpha <= 1.0*10^{-6}$ $K^{-1}$, particularly preferably $\alpha <= 0.1*10^{-6}$ $K^{-1}$, is not absolutely necessary and can be disregarded, for example, if the distance is measured on the basis of an optical measuring principle.

Movements of the workpiece which are transverse to the intended cutting planes are detected by measuring the distance from a measuring device to a measurement point whose spatial position is dependent on corresponding movements of the workpiece. The measurement point is preferably situated on the workpiece, or the workpiece mounting, for example on the feed mechanism housing, or on measuring elements which are linked to the workpiece or the workpiece mounting. Measuring elements are preferably manufactured from a material whose coefficient of thermal expansion is $\alpha <= 1.0*10^{-6}$ $K^{-1}$, particularly preferably $\alpha, +0.1*10^{-6}$ $K^{-1}$. Since the position of the workpiece is altered in relation to the wire segments after a deflection movement of the workpiece, an incorrect position of the wire segments in relation to the intended cutting planes also results de facto from this movement. The amount of the incorrect position of the wire segments corresponds to the amount of the measured distance change before and after the movement of the workpiece. In addition to the measuring devices mentioned in connection with the monitoring of movements of the wire segments, measuring devices which determine the distance to the measurement point by mechanical sensing are suitable as measuring devices.

The wire saw may be equipped with one or with a plurality of measuring devices. It is preferable to provide at least one measuring device for detecting movements of the workpiece and, for every wire web used as a sawing tool, at least one measuring device per wire guide roller for detecting movements of the wire segments.

Any deviation in the distance determined by the measuring device from a set distance indicates an incorrect position of the wire segments in relation to the intended cutting planes. The set distance is the distance which is measured if the wire segments are situated in the intended cutting planes. Deviations detected in the measured distance from the set distance are transmitted to a controlling device which effects a compensating movement of the wire segments or of the workpiece. The compensating movement brings the wire segments into the intended cutting planes. Suitable controlling devices are known and comprise, for example, piezoelectric translators, thermal rods and hydraulically, pneumatically, magnetically or mechanically operating control gears. Depending on the embodiment of the wire saw, the controlling device is disposed in such a way that an axial force can be exerted therewith on the workpiece, or on the housing of the feed device, or on a wire guide roller of the wire web or on the sawing head. The wire saw may be equipped with one or with a plurality of controlling devices. Desirably, the measuring and controlling devices used are operated with the aid of a computer control, the measurement data are periodically evaluated, and, if necessary, the controlling devices are triggered.

In a preferred embodiment, a controlling device is provided for every wire guide roller of a wire web used as sawing tool, with the result that any of the wire guide rollers can be caused to perform a compensating movement independently of the other wire guide roller. In this case, the sawing head does not have to be moved concomitantly. In other embodiments, only one controlling device with which a compensating movement of the workpiece, or the housing of the feed device or of the sawing head can be effected is provided.

At the start of the sawing procedure, the guidance system can be used even before the wire segments penetrate the workpiece in order to effect a particular orientation of the wire segments in relation to the workpiece of the compensating movement of a wire guide roller of the wire web or as a result of opposing compensating movements of two wire guide rollers of the wire web. This is of great benefit, for example, if the workpiece is a crystal rod of semiconductor material and the intended cutting planes are required to cross the crystal lattice at a particular angle. So that the respective controlling device can cause the required compensating movement of the wire guide roller, a set distance has to be inputted which corresponds to the desired orientation of the wire segments.

In addition to the object, already mentioned, of the sawing method for obtaining wafers having as flat and parallel side surfaces as possible, the object may also be to produce wafers having parallel side surfaces whose profile is, however, not straight but deviates in a predetermined manner from a straight line, for example appearing curved, corrugated or stepped. The guidance system of the wire saw makes it possible that even such specially shaped wafers can be produced with high precision. For this purpose, during the sawing operation, the set distance is deliberately changed in such a way that the controlling device causes the workpiece or the wire segments to perform a compensating movement, bringing the wire segments into the intended cutting planes which are in this case not flat.

At the end of a sawing operation, after the feed movement has been completed, the guidance system can be used to cause the wire segments to perform a laterally directed movement. This is desirable if the wire segments have already penetrated into the workpiece mounting strip on which the workpiece was fixed. As a result of the lateral movement, which must be equal at least to the path length between two wire segments, the wafers are cut from the remainder of the workpiece mounting. The loose wafers can then be picked up by a transport tray provided.

A further advantage of the guidance system is that any play in the mountings, which occur as a result of wear of the mounting spindles, can be detected early and eliminated.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
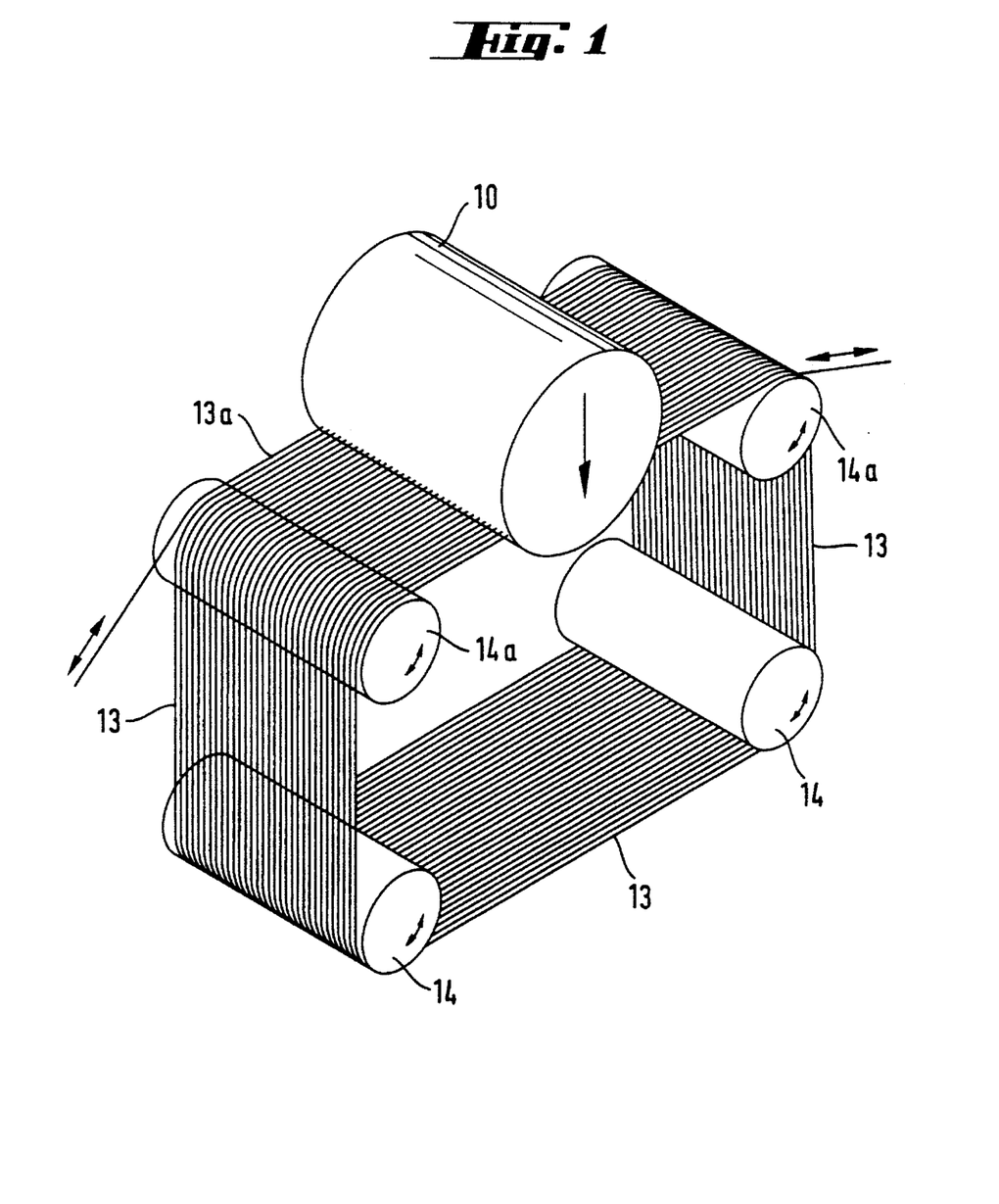
FIG. 1 shows the diagrammatic representation of a roller system having four wire guide rollers.

Turning now in detail to the drawings, the roller system shown in FIG. 1 comprises four wire guide rollers 14 around which a finite wire is coiled. Between every two wire guide rollers there is a wire grating 13 which is formed from a multiplicity of wire segments arranged in parallel. An arrow indicates that a rod-shaped workpiece 10 is moved toward a wire web 13a used as a sawing tool The wire guide rollers of this wire web are identified by the reference numeral 14a.

Each of the wire saws shown in FIGS. 2 to 5 is equipped with a roller system in accordance with FIG. 1. Furthermore, each wire saw has a feed device 18 with which the workpiece 10 mounted on the feed table 9 is moved in a downward directed feed movement toward the wire web 13a of the roller system. In the side view, only one wire guide roller 14a of the wire web is visible in each case. All the descriptions below relating to this wire guide roller apply in a corresponding manner also to the second guide roller of the wire web situated in front of the wire guide roller 14a. The wire guide roller 14a is mounted between a fixed bearing 6 and a movable bearing 7. The wire guide roller is linked to the bearings via bearing spindles 19. The fixed bearing 6 is preferably a pretensioned axial bearing, for example a rolling bearing pretensioned with springs, or a hydrostatic bearing. Axial movements of the wire guide roller 14a which are transverse to the intended cutting planes are monitored by a measuring device 2a which is situated on a reference plate 8. The reference plate 8 is mounted on the machine frame and is preferably composed of a material having a low coefficient of thermal expansion.

Mounted on the reference plate 8 above the measuring device 2a is a further measuring device 2b. The common mounting on the reference plate ensures that the distance measurements performed by the measuring devices 2a and 2b only reveal movements of the workpiece and/or of the wire segments which are transverse to the intended cutting planes. The measuring head of the measuring device 2b is constructed as elongated measuring rod 3 which extends laterally up to the vicinity of the measuring bar 5 and at whose tip the measuring sensor, which is not shown in the figures, is situated. The measuring bar 5 is mounted in parallel with the feed guide on the feed device 18 which is moved with the workpiece 10. The measurement point for detecting an incorrect position of the wire segments is situated on the side surface 5a of the measuring bar 5.

Figure 2:
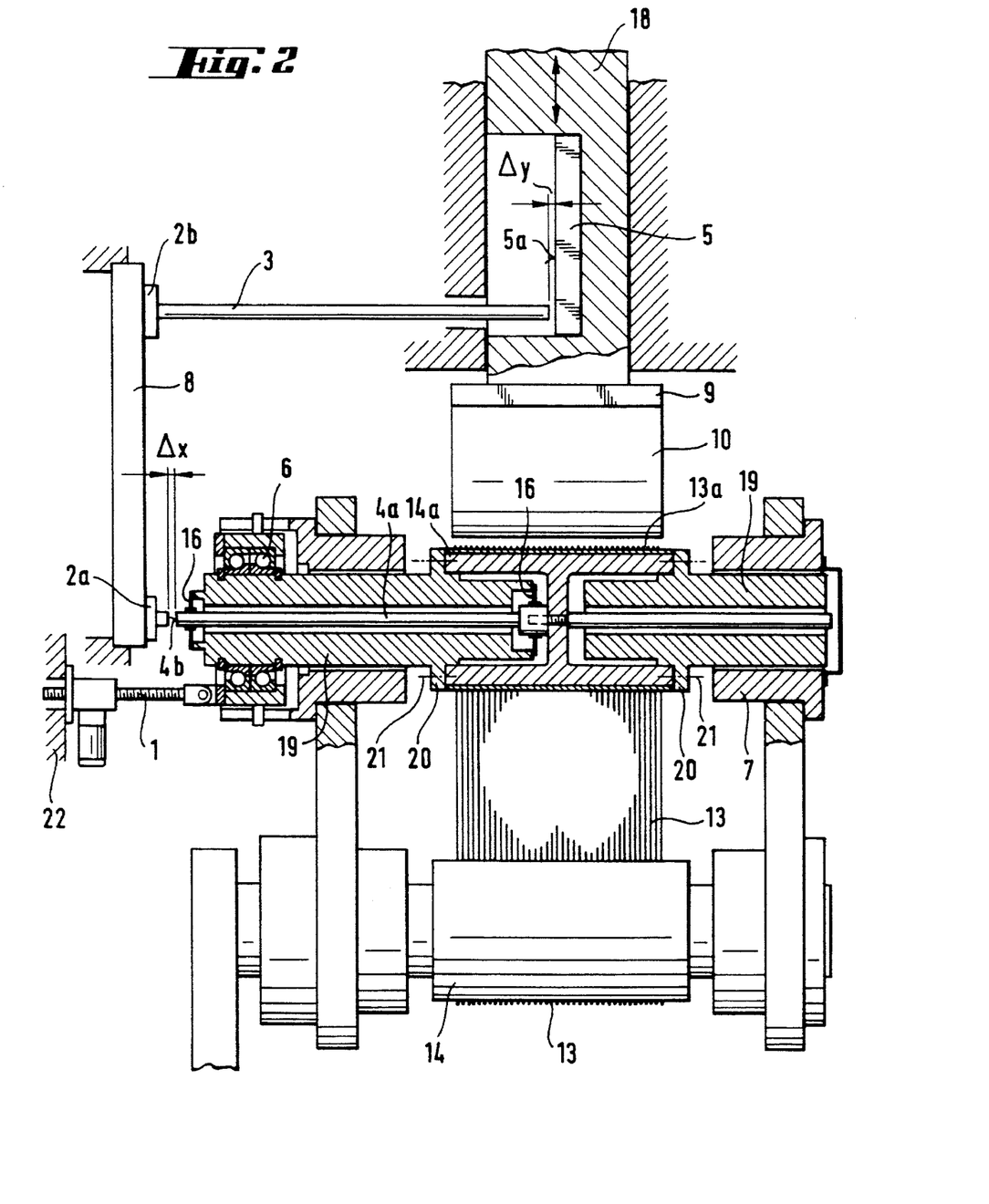
FIGS. 2 to 5 show a partly cut-away side view of preferred embodiments of wire saws according to the invention laving a roller system in accordance with FIG. 1.
Figure 2A:
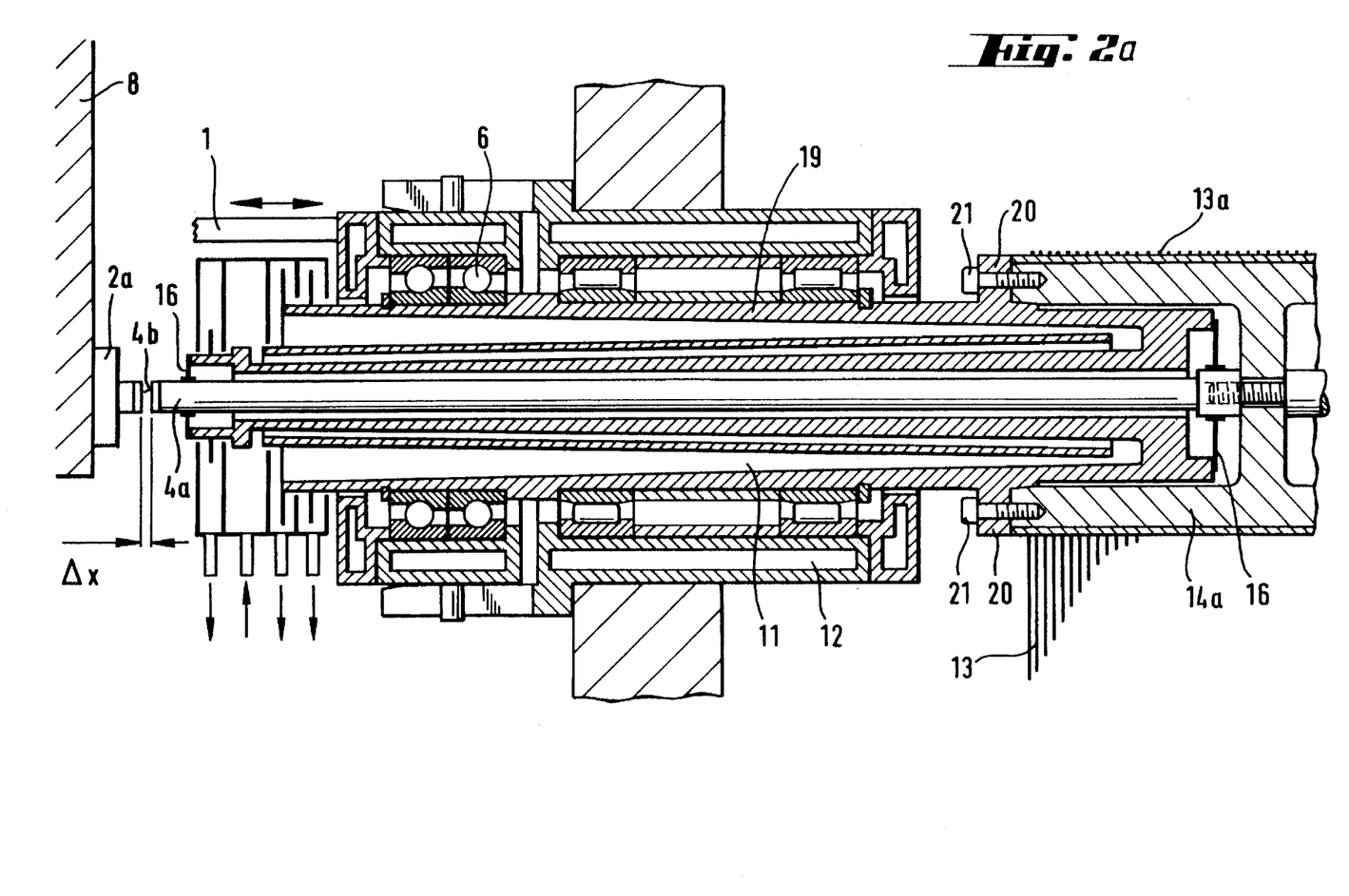
FIG. 2a shows an enlarged detail view from FIG. 2.

The embodiment in accordance with FIG. 2 is now explained in greater detail. The wire guide roller 14a is linked to the bearing spindles 19 by means of flanges 20 and screws 21. Furthermore, the wire guide roller is linked in its axial center to a measuring shaft 4a which is directed toward the measuring device 2a. The measuring shaft used as measuring element is centered in the hollow bearing spindle 19 by axially elastic guide elements 16 and is secured against twisting. Situated on that end face 4b of the measuring shaft 4a that points toward the measuring device is the measurement point for detecting an incorrect position of the wire segments of the wire web. In FIG. 2a, the fixed bearing 6 with the bearing spindle 19 is shown in an enlarged detail view. Provided in the bearing spindle are cooling channels 11 through which a coolant flows which ensures an effective internal cooling of the bearing spindle and to some extent also of the wire guide roller. The cooling channels 11 preferably have a conical shape which has the effect that the coolant is flushed through the cooling channels as a result of the rotation of the wire guide roller. Further cooling channels 12 which have coolant flowing through them are present on the bearing side for the external cooling of the bearing spindles.

If the distance to the end face 4b of the measuring shaft 4a measured by the measuring device 2a deviates from a set distance, the controlling device 1, which is braced against the machine frame 22, will effect a compensating movement of the wire guide roller 14a. If the intended cutting planes are flat, the distance to the measurement point chosen at the start of the sawing operation is also the initial set distance. If the distance measurement performed with the measuring device 2a during the sawing operation yields a deviation from the set distance of amount $\Delta x$, the controlling device will introduce a force into the fixed bearing 6 which is transmitted to the wire guide roller 14a and effects a displacement of the wire guide roller by the amount $-\Delta x$. This operation takes place without influencing the position of the remaining wire guide rollers or of the sawing head. The distance measurement will again yield the set distance after the compensating movement of the wire guide roller.

On the other hand, if the distance measurement by the measuring device 2b indicates a movement of the workpiece which is transverse to the intended cutting planes because a deviation from the set distance of amount $\Delta y$ is determined, the controlling devices 1 of both wire guide rollers 14a become active and effect a displacement of each wire guide roller 14a by the amount $\Delta y$ as a result of a corresponding force transmission. The distances measured after the compensating movement by the measuring devices 2a and 2b are received by the computer control as new set distances which provide a reference for the subsequent distance measurements.

Instead of two controlling devices which axially displace each wire guide roller 14a individually, it is also possible to provide only one controlling device which moves the entire cutting head. In this case, the deviation detected by the measuring devices 2a from the respective set distance are averaged and the average is used as the basis for a possible action by the controlling device.

Figure 3:
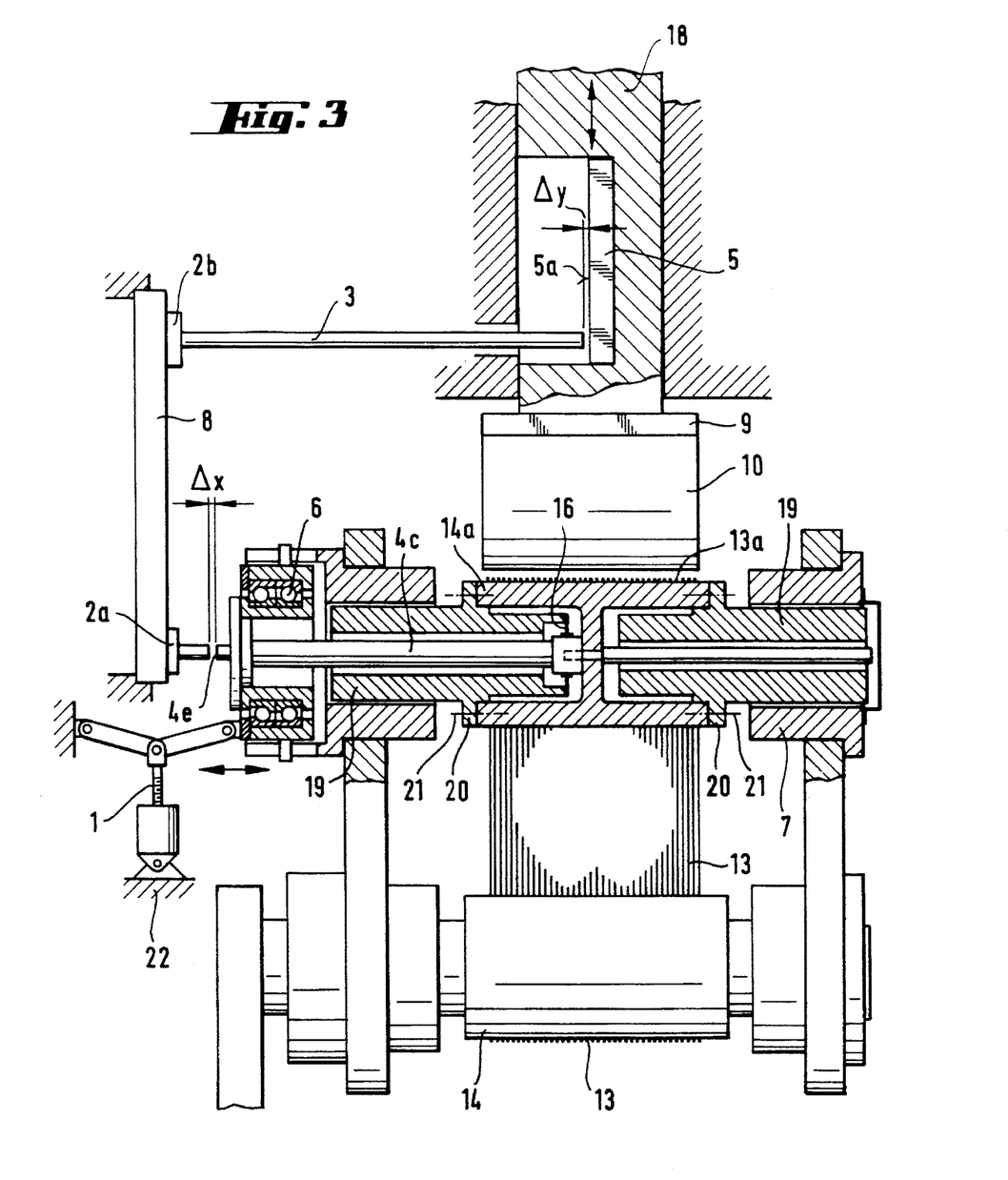

In the case of the embodiment shown in FIG. 3, a measuring shaft 4c which is linked to the wire guide roller 14a in its axial center and is fixed in the fixed bearing 6 is provided as a measuring element. The measurement point is situated on that end face 4e of the measuring shaft that points toward the measuring device 2a. The measuring shaft 4c is centered in the hollow bearing spindle by an axially elastic holding element 16. After a distance deviation has been detected, the controlling device 1, which is shown as a mechanically operating control gear, transmits a force via the fixed bearing 6 and the measuring shaft 4c to the wire guide roller 14a, as a result of which the wire guide roller is caused to perform an axial compensating movement. The response to a detected deviation of the distance of amount $\Delta x$ or $\Delta y$ is carried out in the same way as was described above with regard to the embodiment in accordance with FIG. 2.

Figure 4:
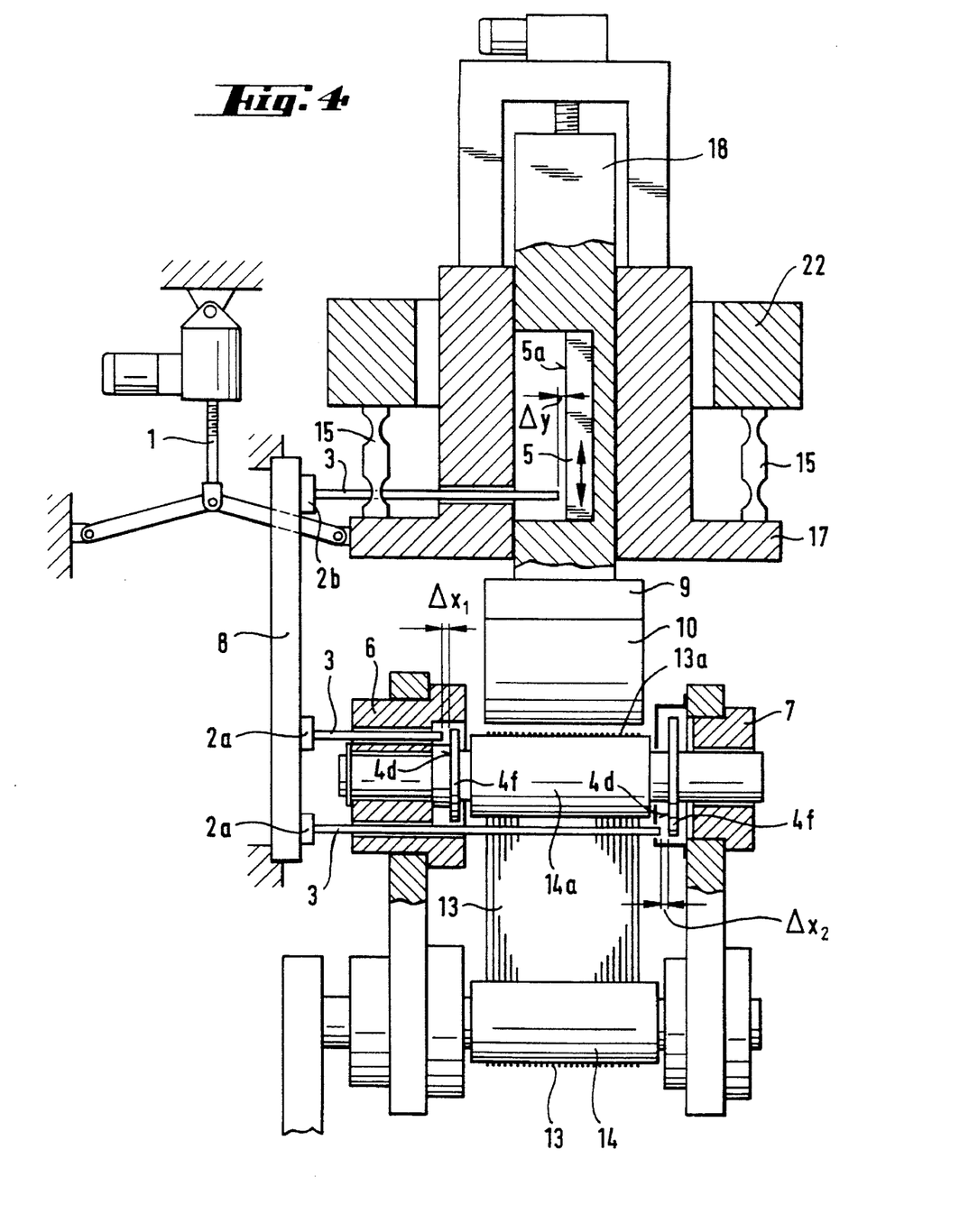

A further embodiment of the invention is shown in FIG. 4. In this embodiment, two measuring discs 4f are provided as measuring elements on each side of the wire guide roller 14a in the immediate vicinity of the first and last wire segments of the wire grating. Each measuring disc may be a component of the bearing spindle or it may be fixed as an independent component between the bearing spindle and the wire guide roller. The measuring discs may be manufactured from a material having a low coefficient of thermal expansion or be composed of metal or coated with metal. Due to the comparatively small thickness of the measuring discs, the result of the distance measurement is virtually unimpaired by heat-induced longitudinal expansions of the measuring discs in the axial direction. Each measuring disc 4f is associated with a measuring device 2a mounted on the reference plate 8. Situated on those side surfaces 4d of the measuring discs that point toward the measuring devices is the measurement point for the distance measurements. The measuring head of the measuring device is constructed as an elongated measuring rod which extends up to the vicinity of side surfaces 4d. The embodiment shown is furthermore equipped with a controlling device 1 which can effect movements of the workpiece. The force is applied by the controlling device to the housing 17 of the feed device 18. This housing 17 is held on the machine frame 22 by elastic holding elements 15. Instead of the holding elements 15, linear guides may also be provided along which the feed mechanism housing can be moved with the workpiece.

The axial movements of the wire guide roller are measured in this embodiment approximately in line with the first and last wire segments. The deviations $\Delta x_1$ and $\Delta x_2$ (of the wire guide roller 14a) and $\Delta x_3$ and $\Delta x_4$ (of the oppositely situated wire guide roller 14a, which is not visible) from the respective set distance determined by the measuring devices 2a do not necessarily have to agree precisely. They are combined to form a mean value $\Delta x=(\Delta x_1+\Delta x_2+\Delta x_3+\Delta x_4)/4$. In response to a detected deviation of amount $\Delta x$, the controlling device will displace the housing of the feed device likewise by the amount $\Delta x$. The distances determined after the displacement by the measuring devices 2a and 2b are used as a basis for new set distances in subsequent measuring cycles. If a deviation of amount $\Delta y$ occurs in the measurement with the measuring device 2b, the controlling device will effect a compensating movement of the housing of the feed device by the amount $-\Delta y$ so that the original set distance is reached again.

In addition, two controlling devices may be provided with which axial movements of the wire guide rollers can be effected in each case. In this case, if a deviation of amount $\Delta x=(\Delta x_1+\Delta x_2)/2$ or $\Delta x=(\Delta x_3+\Delta x_4)/2$ occurs, a compensating movement is effected which displaces the respective guide roller 14a of the wire grating by the amount $-\Delta x$.

Figure 5:
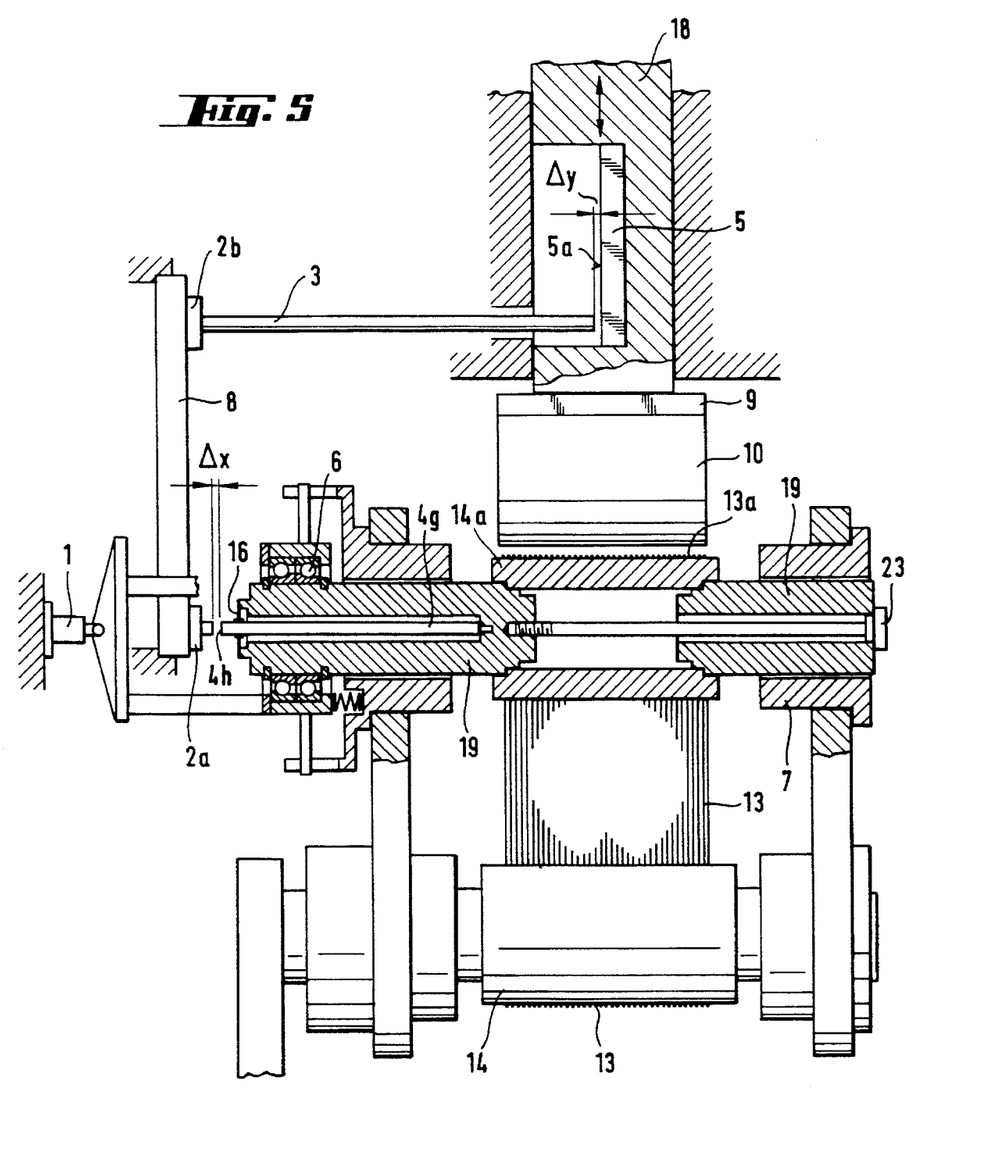

In the embodiment in accordance with FIG. 5, a measuring shaft 4g which is mounted in the hollow bearing spindle in line with the first wire segment and is centered by the axially elastic holding element 16 is provided as a measuring element. A central screw 23 introduced from the side of the movable bearing 7 holds the wire guide roller 14a and the bearing spindles 19 together. The measuring point is situated on that end face 4h of the measuring shaft 4g that points towards the measuring device 2a. Axial compensating movements of the wire guide roller are effected after a detected deviation of the measured distance from the set distance by the controlling device 1. The force necessary for this purpose is introduced into the fixed bearing 6 and is transmitted to the wire guide roller 14a via the bearing spindle 19.

A detected deviation of amount $\Delta x$ is followed by displacement of the wire guide roller by the amount $-\Delta x$, with the result that the original set distance is reached again. After a deviation of amount $\Delta y$ determined by the measuring device 2b, both wire guide rollers 14a of the wire grating 13a are axially displaced with the aid of the controlling devices 1 by the amount $\Delta y$.

The embodiments shown in FIGS. 2 to 5 are to be regarded as examples which do not limit the scope of the invention. Thus, in particular, the number of wire guide rollers used and the wire grating used as the sawing tool can be varied for wire saws falling within the scope of the invention. Instead of a feed device which moves the workpiece, a feed device which moves the sawing head can also be provided.

While several embodiments of the present invention have been shown and described, it is to be understood that many changes and modifications may be made thereunto without departing from the spirit and scope of the invention as defined in the appended claims.

What is claimed is:

1. A wire saw for cutting wafers from a workpiece comprising
    a machine frame;
    a feed device, having a roller system combined to form a cutting head and comprising a plurality of wire guide rollers which are linked to bearing spindles and are rotatably mounted and of which at least one is driven, and having at least one wire web used as sawing tool and comprising wire segments which are disposed in parallel between two wire guide rollers and which are moved perpendicularly to the axes of the wire guide rollers around the roller system and which work through the workpiece along intended cutting planes with the aid of the feed device, with eroding means being supplied and with the formation of a multiplicity of parallel sawing gaps;
    a guidance system for the guidance of the wire segments into the intended cutting planes having at least one measuring device and at least one controlling device;
    the measuring device detecting an incorrect position of the wire segments in relation to the intended cutting planes by measuring the distance from a measurement point whose spatial position is dependent on the incorrect position of the wire segments; and
    the controlling device effecting, if necessary, a compensating movement of the wire segments or of the workpiece by means of force transmission, which compensating movement brings the wire segments into the intended cutting planes.

2. The wire saw as claimed in claim 1,
    wherein the measuring device comprises a distance measuring device which operates on the basis of a mechanical, optical, hydraulic, pneumatic, capacitive or inductive measuring principle.

3. The wire saw as claimed in claim 1,
    wherein the controlling device selected from the group consisting of piezoelectric translators, thermal rods and hydraulically, pneumatically, magnetically or mechanically operating control gears.

4. The wire saw as claimed in claim 1,
    wherein the bearing spindles having conically tapered channels for the internal cooling of the bearing spindles and of the wire guide rollers of the wire web.

5. The wire saw as claimed in claim 1, comprising
means for permitting a movement of the workpiece which is transverse to the intended cutting planes.

6. The wire saw as claimed in claim 1,
    wherein the measuring device comprises a sensing bar which is disposed in parallel with the feed guide of the feed device; and
said sensing bar having a side surface pointing toward the measuring device which forms the measurement point.

7. The wire saw as claimed in claim 1,
    wherein said measuring device comprises a measuring shaft which is centered in a hollow bearing spindle by means of elastic holding elements; and said measuring shaft is mounted on the wire guide roller of the wire web in the axial center thereof; and said measuring shaft having an end face pointing toward the measuring device for forming the measurement point.

8. The wire saw as claimed in claim 1,
    wherein said measuring device comprises a measuring disc which is fixed between the wire guide roller and an adjacent bearing spindle as closely in line with the first or last wire segment of the wire web as possible; and said measuring disc having a side surface pointing toward the measuring device for forming the measurement point.

9. The wire saw as claimed in claim 1,
    wherein said measuring device comprises a measuring shaft which is centered in a hollow bearing spindle by means of elastic holding elements; and said measuring shaft is mounted on the bearing spindle as closely in line with the first or last wire segment of the wire web as possible; and said measuring shaft having an end face pointing toward a fixed reference point for forming the measurement point.

10. The wire saw as claimed in claim 9,
    wherein the measuring shaft comprises a shaft which is linked to a bearing of the wire guide roller.

11. The wire saw as claimed in claim 1, comprising
means for mounting wire guide rollers of the wire web in an axially movable manner.

12. The wire saw as claimed in claim 1, comprising
means for mounting a sawing head so as to be movable transversely to the intended cutting planes.

13. The wire saw as claimed in claim 1, comprising
a plurality of wire webs for the simultaneous machining of a plurality of workpieces.

14. The wire saw as claimed in claim 1,
    wherein the measuring element and, optionally, the wire guide rollers of the wire grating are manufactured from a material whose coefficient of thermal expansion $\alpha <= 1.0 * 10^{-6}$ $K^{-1}$.

15. The wire saw as claimed in claim 1, wherein the measuring element and, optionally, the wire guide rollers of the wire grating are manufactured from a material whose coefficient of thermal expansion $\alpha <= 0.1 * 10^{-6}$ $K^{-1}$.

16. A method for cutting wafers from a workpiece with the aid of a wire saw comprising detecting an incorrect position of wire segments in relation to intended cutting planes with the aid of a measuring device by measuring a distance to a measurement point whose spatial position is dependent on an incorrect position of the wire segments; and in the event of a deviation of the measured distance from a set distance, effecting a compensating movement of the wire segments or of the workpiece with the aid of a controlling device, which compensating movement brings the wire segments into the intended cutting planes.

17. The method as claimed in claim 16, comprising effecting compensating movement of the workpiece by force transmission to the workpiece by the controlling device.

18. The method as claimed in claim 16, comprising effecting compensating movement of the workpiece by force transmission of the controlling device to the housing of the feed device.

19. The method as claimed in claim 16, comprising effecting compensating movement of the wire segments by force transmission from the controlling device to the wire guide roller of the wire grating.

20. The method as claimed in claim 16, comprising effecting compensating movement of the wire segments by force transmission from the controlling device to the cutting head.

21. The method as claimed in claim 16, comprising effecting compensating movement of the wire segments before the start of the cutting of the wafers from the workpiece and the wire segments thereby acquiring a particular orientation relative to the workpiece.

22. The method as claimed in claim 16, comprising varying a set distance in accordance with a predetermined program during the cutting of the wafers from the workpiece.

23. The method as claimed in claim 16, comprising terminating the feed movement after the cutting of the wafers from the workpiece; and effecting a compensating movement of the wire segments which movement is equal at least to the distance between two wire segments of the wire web and said movement is directed laterally.

24. The method as claimed in claim 16, comprising using said guidance system for the early detection of play in the bearings.

* * * * *